H. C. KIRK, Jr.
SPRING TAKE-UP.
APPLICATION FILED JULY 7, 1914.
1,142,817.
Patented June 15, 1915.
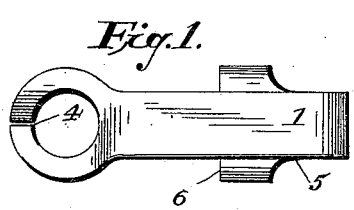
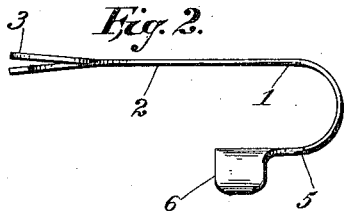
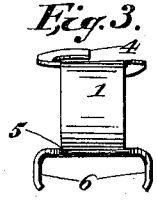
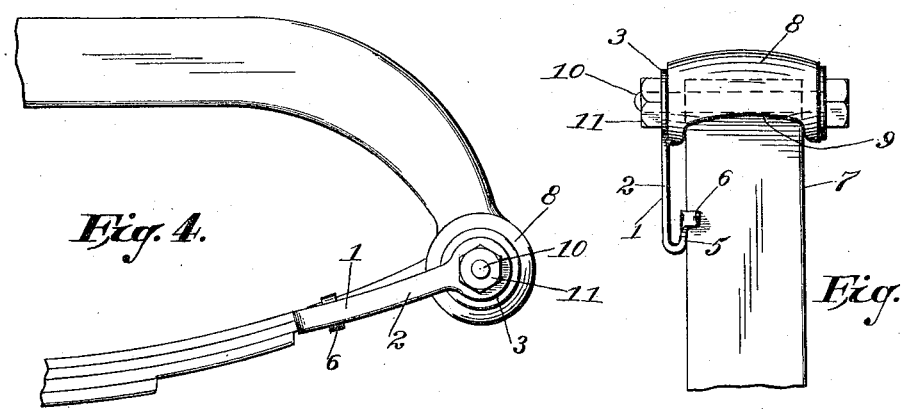
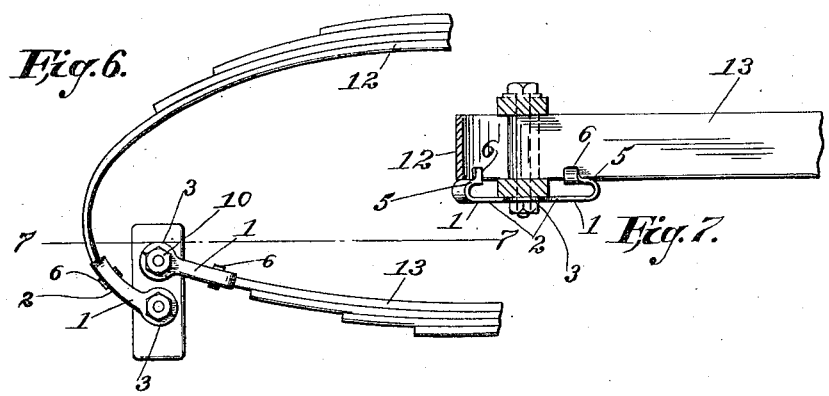
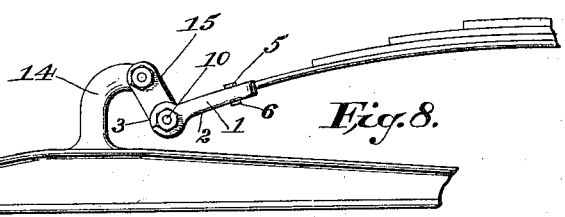
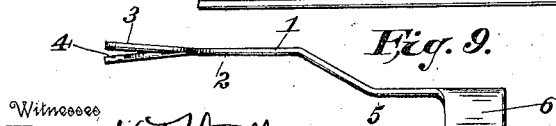
Witnesses
Porter H. F. Fault.
Maud B. Hebner.
Inventor
Henry C Kirk Jr
by
Stuart & Stuart
Attorneys
THE NORRIS PETERS CO., PHOTO-LITHO., WASHINGTON, D. C.

UNITED STATES PATENT OFFICE.

HENRY C. KIRK, JR., OF ROLAND PARK, MARYLAND.

SPRING TAKE-UP.

1,142,817.          Specification of Letters Patent.          Patented June 15, 1915.

Application filed July 7, 1914.   Serial No. 849,377.

*To all whom it may concern:*

Be it known that I, HENRY C. KIRK, Jr., a citizen of the United States of America, residing at Roland Park, Baltimore county, Maryland, have invented certain new and useful Improvements in Spring Take-Ups, of which the following is a specification.

This invention relates to a clip to be applied to the spring suspensions of automobiles and other vehicles.

It is a fact well-known to those skilled in the art that the greater part of the rattle which is generally incident to the operation of old vehicles of this sort, is due to the play of the springs at the suspension pins. This can be reduced in some instances for the time being, by tightening the nut which holds the pin in place and drawing the ears in which the pin is carried together, the degree to which this is possible being determined by the weight and stiffness of the parts and their formation. In some cars, the ears are connected by a circular wall forming a cup or socket for the reception of the end or eye of the spring and with such construction, it is wholly impossible to accomplish anything in the way of taking up the play by tightening the bolt or pin. Even where the ears or lugs yield slightly, this method is ineffective because they are thrown out of line when pulled together and soon wear so as to neutralize the benefit obtained.

Another way of accomplishing the same end is by the introduction of thin washers between the spring eye and the ears which hold the pin, but in order to get these washers in, they must be made very thin so that they are of little service as they are quickly ground up and destroyed.

Various devices of the same general nature have been tried but no satisfactory result has been reached. To overcome these difficulties and to provide effective means for taking up the lateral play of the springs at the suspension pivot, is the object of the present invention.

To this end, I provide a spring clip which engages the side of the vehicle spring near the end and applies constant lateral pressure, tending to hold the spring against one side of the socket and thus prevent rattling. In order that this device may not be subject to destruction by grinding, as are the others which are offered to the trade, it takes its bearing not inside, but outside of the socket, preferably under the nut on the suspension pin or shackle bolt, or it may be otherwise secured to the chassis, particularly to the ends of the longitudinal beams thereof, within the scope of the invention.

In the form of the invention shown, the clip is a bent plate spring, having at one end an eye to take over the suspension pin or bolt beneath the nut, the other end being provided with outwardly disposed jaws to engage the edge or side of the vehicle spring and press it against one of the ears carrying the suspension pin.

By the use of this device not only is rattling of the springs prevented but the necessity for tightening the suspension pin is eliminated making the springs much freer in their action with a resulting increase in the ease with which the car rides.

A spring clip constructed in accordance with my invention in its preferred and an alternate form together with various types of spring suspensions to which the clip is applied, is illustrated in the accompanying drawing, in which—

Figure 1 is a side elevation of the clip; Fig. 2 is a plan; Fig. 3 is an end view; Fig. 4 is a side elevation of the front end of a chassis beam showing a fragment of the spring with the clip in operative position; Fig. 5 is a bottom plan of the same; Fig. 6 is a fragmentary view of a double rear spring suspension with two of the clips of the invention applied thereto; Fig. 7 is a horizontal section on the line 7, 7 of Fig. 6; Fig. 8 is a view showing the application of the clip to the forward spring of the well-known Ford suspension; and Fig. 9 shows a modified form of clip.

Referring to the drawings by numerals each of which is used to indicate the same or equivalent parts in the different figures, the clip 1 shown in Figs. 1 to 8, consists of a U-shaped steel spring, the leg 2 of the U being elongated to a considerable extent and provided with an eye 3 to take over the end of the suspension pin or bolt beneath the nut. In this form of the invention, though this is not an essential feature, the eye is split at 4 and the two halves are bent out of alinement as illustrated in Figs. 2 and 3, so that they form a split washer to act as a friction lock on the nut. The short leg of the U is provided with jaws 6 to engage the edge of the vehicle spring, as illustrated in Figs. 4 to 8. The jaws are spaced by a distance much greater than the width of the vehicle spring so the latter may move freely up and down without swinging the clip about the pin or giving it any tendency to wear.

The application of the invention to spring suspensions of the various types is clearly illustrated in Figs. 4 to 8.

In Figs. 4 and 5, I have shown the front ends 7 of the longitudinal beams of the chassis brought well forward, depressed at the extreme ends and provided with two ears connected to form a cup 8 to receive the spring, the end of which is provided with an eye 9 which is secured in the cup by means of a bolt or pin 10 passing through the ears and provided with a nut 11 taking over the end of the pin. It will be noted that the end of the spring is of sufficient width to fit the cup, or vice versa, and when the car is new there is no play, the purpose of the device of the invention being to take up the play after the parts have become worn from use, but the life of the clip is unlimited and it may be applied to new cars to become effective when wear appears.

In Figs. 6 and 7, I have shown a double suspension with a clip 1 applied to the edges of the springs 12 and 13.

In the Ford suspension, the axle is provided with an upright bracket 14 from which a link 15 is suspended, the link having ears which receive the pin 10 and embrace the end or eye of the spring through which the pin passes. The manner of applying the clip is similar to the manner of its application to the other types of suspension.

In Fig. 9 of the drawing I have shown a modified form of the invention, consisting of a spring plate slightly offset but not in the form of a U.

The operation of the invention will be clearly apparent from the preamble and description taken in connection with the drawing. When the spring has become loose, or even when the car is new, the clip is applied by taking off the nut 11, placing the eye of the spring over the end of the pin or bolt 10, putting on the nut over the eye and engaging the adjacent side of the spring with the jaws 6. In this position the spring clip is compressed, deflecting the arms 2 and 5 inward toward the center of the U, and the vehicle spring-eye is forced over to the remote side of the socket, taking up any play which may exist. As the wear increases, the clip still serves its purpose and any amount of play may be present without any resulting noise from this part of the machine.

An important advantage of the device of the invention, is the arrangement whereby the clip, instead of being placed inside the socket where it would be subject to grind and its utility thus reduced, is placed outside the socket where there is practically no grinding action and it is subject to so little wear that its life is practically unlimited.

I have thus described two embodiments of my invention specifically and in detail in order that its nature and operation may be clearly understood by those skilled in the art. However, the device and the features thereof may be widely varied and differently applied without departure from the principle of the invention.

The specific terms are used descriptively rather than in their limiting sense and the scope of the invention is defined in the claims.

I claim—

1. A take-up clip for a vehicle spring suspension consisting of a bent spring having an eye to receive a suspension pin at one end and jaws at the other end to engage the edge of the vehicle spring.

2. A take-up clip for vehicle spring suspension consisting of a bent spring having means on one end for engaging the chassis and means on the other end for engaging the vehicle spring.

3. A take-up clip for vehicle spring suspension consisting of a U-shaped spring having one leg longer than the other, an eye for a bolt at the end of the elongated leg and jaws at the end of the short leg.

4. A take-up clip for vehicle spring suspension consisting of a bent spring having an eye for a bolt at one end, leg and jaws at the other end, the eye being split and the separated portions offset to form a nut locking device.

5. In a vehicle spring suspension, spaced ears on the chassis to receive the end of the vehicle springs, a suspension pin, the ears being apertured to receive the pin, a spring having its end between the ears, the end of the spring having an eye to receive the pin and a take-up clip in the form of a bent spring having an eye at one end taking over the end of the pin outside one ear, a nut to hold the eye in place and jaws on the other end of the spring to engage the edge of the vehicle spring.

6. In a vehicle spring suspension, spaced ears on the chassis to receive the end of the vehicle springs, a suspension pin, the ears being apertured to receive the pin, a spring having its end between the ears, the end of the spring having an eye to receive the pin, and a take-up clip in the form of a bent spring having an eye at one end taking over the end of the pin outside one ear, a nut to hold the eye in place and jaws on the other end of the spring to engage the edge of the vehicle spring, the jaws being spaced apart to permit play of the vehicle spring without changing the relation of the clip to the suspension pin.

7. In a vehicle spring suspension, spaced ears to receive the end of the vehicle spring, a suspension pin, the ears being apertured to admit the suspension pin, a spring having its end between the ears, the end of the spring having an eye to receive the pin, a take-up clip in the form of a spring having an eye to take over the pin outside one ear, a nut to hold the eye in place, and jaws on the other end of the spring to engage the edge of the vehicle spring.

Signed by me at Baltimore, Maryland, this 2nd day of July 1914.

HENRY C. KIRK, Jr.

Witnesses:
EDWARD L. BASH,
EDWIN F. SAMUELS.